United States Patent [19]

Baldoni

[11] 4,416,720

[45] Nov. 22, 1983

[54] TIRE FORMING DRUM

[75] Inventor: Viscardo Baldoni, Rome, Italy

[73] Assignee: The Firestone Tire & Rubber Company, Akron, Ohio

[21] Appl. No.: 420,751

[22] Filed: Sep. 20, 1982

[30] Foreign Application Priority Data

Sep. 29, 1981 [IT] Italy ............................... 68253 A/81

[51] Int. Cl.$^3$ ...................... B29H 17/22; B29H 17/16
[52] U.S. Cl. ................................... 156/401; 156/132; 156/415; 156/416
[58] Field of Search ............... 156/398, 400, 401, 403, 156/414–420, 110 R, 123 R, 124, 132, 133, 394.1; 157/15, 16; 29/235, 243.57; 269/27

[56] References Cited

U.S. PATENT DOCUMENTS

| | | | |
|---|---|---|---|
| 2,986,196 | 5/1961 | Frazier | 156/416 |
| 3,053,308 | 9/1962 | Vanzo et al. | 156/416 |
| 3,127,294 | 3/1964 | Porter | 156/131 |
| 3,265,549 | 8/1966 | Woodhall et al. | 156/401 X |
| 3,692,605 | 9/1972 | Cantarutti | 156/132 |
| 3,989,564 | 11/1976 | Touchette et al. | 156/118 |

FOREIGN PATENT DOCUMENTS 1753663  3/1972  Fed. Rep. of Germany .

*Primary Examiner*—Edward C. Kimlin
*Assistant Examiner*—Thomas Bokan
*Attorney, Agent, or Firm*—Ernst H. Ruf

[57] ABSTRACT

A tire forming drum provided with two half drums axially mobile relative to each other and arranged to support on their outer periphery tubular plies of a carcass to be formed, each half drum being arranged to produce automatic folding of the relative end of said tubular plies about a respective annular bead by means of a respective multiple air chamber element rigid at one end with an outer flange of the relative half drum, and at the other end with a tubular support member mobile under the thrust of said multiple air chamber element between a retracted rest position inside said flange and an extracted working position in which said tubular member projects axially outward from the relative half drum.

8 Claims, 1 Drawing Figure

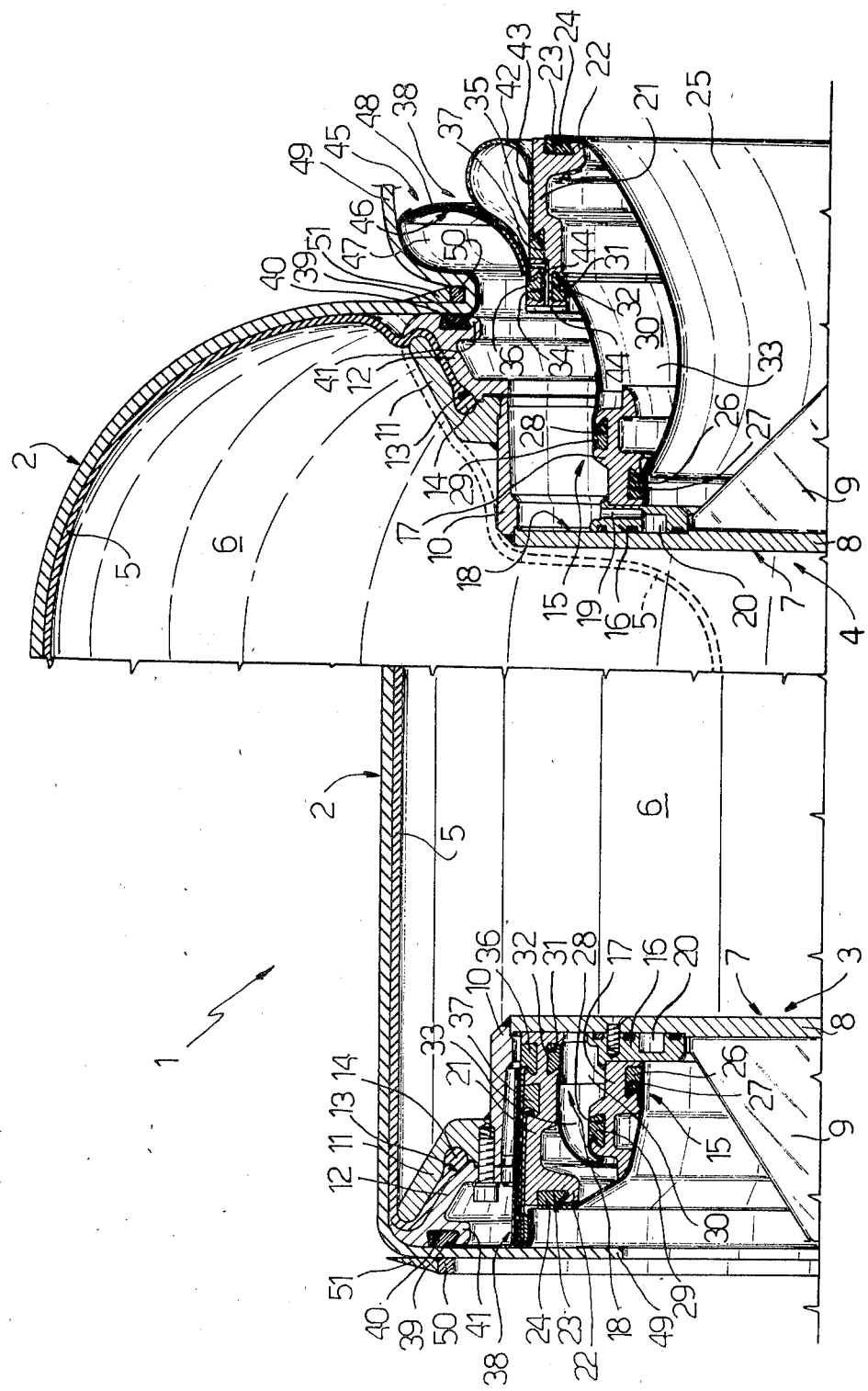

TIRE FORMING DRUM

This invention relates to a tire forming drum particularly suitable for use in forming large-dimension carcasses such as, for example, the carcasses of agricultural vehicle tires.

In manufacturing large-dimension tire carcasses, it is known to dispose a plurality of tubular plies on a forming drum comprising two half drums which are mobile axially relative to each other but are angularly fixed. Each half drum supports a relative end of said tubular plies, which project beyond the outer extremity of the relative half drum and are normally folded manually over said outer end in order to define a flat annular surface on which an annular bead and a relative annular filling element are made to adhere by simple pressure.

During the forming of the carcass, which is normally carried out by feeding compressed air to an air chamber defined by an annular elastomeric element extending between the two half drums and fixed thereto, the said end portions of the plies defining the two flat end annular surfaces are folded outward so that they wrap around the relative beads together with said annular filling elements.

In the case of known forming drums of the aforesaid type, the ply ends are folded over the beads manually by an operator, with obvious drawbacks due both to the relatively long time required and to the fact that the operation is not always performed perfectly. In particular, because of the considerable physical force required of the operator in order to fold the plies outward about the beads, there is often incomplete adherence between the plies and the inner periphery of the beads because of the presence of air bubbles which, during subsequent vulcanization, prevent the formation of a continuous rubber-metal joint between the plies and beads.

Finally, the manual intervention by the operators prevents mass production of tires with constant characteristics, thus making any optimization of the tires either from the structural or economical aspect substantially impossible for the manufacturer.

The object of the present invention is to provide a forming drum which dispenses with the requirement for manual intervention by the operator, and consequently obviates all the aforesaid drawbacks.

Said object is attained according to the present invention by a tire forming drum of the type comprising two coaxial half drums which are angularly rigid with each other but are mobile axially relative to each other, each said half drum comprising an annular member arranged to support tubular plies of a carcass of a said tire and a respective bead thereof, characterized in that each said half drum further comprises a tubular member which is axially mobile, under the thrust of multiple air chamber means disposed between said annular and tubular members, between a rest position in an annular seat provided in that end surface of the relative annular member which is opposite the surface of this latter which faces the other said half drum, and an extracted working position in which said air chamber means are arranged to partly wrap around the relative said bead from the inside by way of a relative end of said tubular plies.

Further characteristics and advantages of the present invention will be apparent from the description given hereinafter with reference to the accompanying drawing which shows a partly sectional view of a non-limiting embodiment thereof in two different stages of operation.

In the FIGURE of the accompanying drawing, the reference numeral 1 indicates overall a drum for forming a carcass 2 of an agricultural tractor tire comprising a plurality of superposed tubular plies. The drum 1 comprises two coaxial annular half drums 3 and 4, arranged to rotate together about a central common axis, not shown. The half drums 3 and 4 are also axially mobile relative to each other, and are connected together by an annular elastomeric element 5 extending about said axis and fixed at its own axial ends to the half drums 3 and 4 in such a manner as to define therewith a central annular air chamber 6 of variable volume.

Each half drum 3, 4 comprises an annular metal member 7 constituted by a central annular plate 8 provided along its inner periphery with a plurality of stiffening webs 9, and along its outer periphery with a cylindrical flange 10 extending axially outward from the air chamber 6. To the free end of the flange 10 there is fixedly connected a rigid annular lip 11 which surrounds the flange 10 and is bent outward in an axial direction from the latter. The lip 11 has an inner frusto-conical surface which is coupled to a corresponding frusto-conical surface of a locking ring 12 demountably connected to lip 11, and defining therewith an annular seat 13 for an annular end bead 14 of the annular element 5.

To that surface of each plate 8 opposite the surface facing the air chamber 6, there is connected a respective cylindrical member 15 comprising an annular base ring 16 connected in a sealed manner to the plate 8 in a position coaxial to the flange 10, and a cylindrical element 17 rigidly connected to the outer surface of ring 16 to define, together with flange 10, an annular seat 18 coaxial to the flange 10 and extending over that surface of annular member 7 opposite the surface facing the air chamber 6.

By way of a duct 19 provided radially in the annular ring 16, each seat 18 communicates with an annular channel 20 provided in the inner surface of the ring 16 and closed on the inside by plate 8. Each channel 20 communicates with a source of compressed gas (not shown) by way of ducts (not shown) provided through ring 16.

When in the rest position, a tubular member indicated generally by numeral 21 is housed inside each seat 18, and is provided, on that end facing outward from its seat 18, with an annular rib 22. In the outer surface of the latter there is provided a trapezoidal seat 23 for anchoring an end bead 24 of an annular element 25 formed from elastomeric material, and provided at its other end with a further bead 26 housed in a respective annular trapezoidal seat 27 provided in the inner cylindrical surface of the cylindrical element 17.

In the outer cylindrical surface of the element 17 there is provided an annular seat 28 of trapezoidal cross section for anchoring an end bead 29 of a tubular support and centering element 30 for the tubular member 21. In its inner surface, the latter includes an annular seat 31 which is analogous to the seat 28 and houses a second end bead 32 of the element 30. The latter is of substantially frusto-conical tubular shape with its flared end facing the bead 32, and in its central part it is in the form of a tubular elastomeric sleeve 33 internally reinforced with stiffening wires (not shown) preferably of metal and extending in an axial direction in order to give the element 30 a high capacity for supporting radial loads.

In its outer cylindrical surface, the tubular member 21 includes two adjacent annular trapezoidal seats 34 and 35 respectively housing an intermediate bead 36 and an end bead 37 for fixing a deformable double air chamber element 38. The latter is of annular shape, and is provided with a further end bead 39 anchored in a respective annular seat 40 of trapezoidal cross section provided in the front of an annular rib 41 extending inward from the outer end of the locking ring 12.

The element 38 comprises a first sleeve 42 preferably constituted of rubberized fabric and extending between the beads 36 and 37 to define an annular chamber 43 of variable volume in communication with the seat 18 by way of ducts 44 provided in the tubular member 21, and a second sleeve 45 extending between the beads 36 and 39 and defining a second air chamber 46 of variable volume in direct communication with the seat 18.

The sleeve 45 is comprised of two axial portions 47 and 48, of which the first is connected with the bead 39 and is preferably constituted of rubberized fabric, whereas the second is rigidly connected at one end to the free end of the portion 47 and at the other end to the outer surface of the sleeve 42 in proximity to the bead 36, and is constituted of rubberized fabric internally reinforced with stiffening wires (not shown) preferably of metal and extending in an axial direction.

As shown in the accompanying drawing, each end of the tubular plies of the carcass 2 is folded outward from the end of the relative half drum 3, 4 in order to form a flat annular rim 49 extending radially inward and disposed, with reference to the axial direction, outside the outer end of the relative tubular member 21. As shown on the left-hand side of the accompanying drawing, member 21 has radial dimensions which are less than those of seat 18, and is completely housed inside the latter when disposed in said rest position.

In addition to the said tubular plies, the carcass 2 comprises two beads, each of which is constituted of a metal ring 50, on the outer surface of which there is mounted an annular filling element 51 having a substantially triangular cross section. Each ring 50 has a diameter substantially equal to that of annular seat 40, and thus greater than the outer diameter of the tubular member 21, and is caused to adhere to that surface of adjacent rim 49 which faces outward in a position coaxial to the relative half drum 3, 4 by applying an axial pressure.

When in use, before mounting the tubular plies of the carcass 2, the two half drums 3 and 4 are displaced, one relative to the other by displacement means, not shown, until they become disposed in the position illustrated on the left-hand side of the accompanying drawing, i.e., in a position in which the element 5 is perfectly stretched between the lips 11 of the half drums 3 and 4 in such a manner as to define a cylindrical surface capable of supporting the tubular plies of the carcass 2.

At the beginning of the operation, each tubular member 21 is disposed in the previously described rest position illustrated on the left-hand side of the accompanying drawing. In particular, when at rest, each tubular member 21 is completely housed inside the relative seat 18, with one of its end surfaces disposed in contact with the outer surface of the adjacent plate 8. Each tubular member 21 is supported in this position by the relative tubular element 30 which is formed in a position facing the outer cylindrical surface of the relative cylindrical element 17, and is kept axially in contact with the relative plate 8 by the axial thrust imparted to it both by the element 25, and by the sleeve 33 of tubular element 30 which, when in its rest position, is slightly inflected in an axial direction.

In said rest position, the sleeves 42 and 45 of each double air chamber element 38 are disposed extended along the outer surface of the relative tubular member 21 in the compartment lying between the latter and the relative flange 10, and partly along the outer surface of the relative annular rib 41.

From the foregoing, it will be noted that, as illustrated on the left-hand side of the accompanying drawing, both the tubular member 21 and the relative double air chamber element 38 are completely housed in the relative seat 18 when the tubular member 21 is retracted into said rest position.

The simultaneous movement of the two tubular members 21 from said retracted or rest position to an extracted working position is attained by feeding compressed air into the two annular channels 20 subsequently to feeding compressed air into the chamber 6. By inflating, the latter causes outward deformation of the plies of the carcass 2, with simultaneous approach of the half drums 3 and 4 toward each other, as shown on the right-hand side of the accompanying drawing.

Entry of compressed air into the seats 18 causes progressive expansion of the air chambers 43 and 46, which determine the consequent emergence of the tubular members 21 from their seats 18 against the thrust applied to them by the annular return elements 25. During their movement, the tubular members 21 are supported by cylindrical elements 17 by way of relative tubular elements 30. Each of the latter, as a result of the inward movement of the relative member 21, folds back on itself by rolling in contact with the inner surface of the relative tubular member 21. Consequently, during substantially the entire axial movement of member 21 from its retracted rest position to its extracted working position, the internal metal reinforcement wires of the sleeves 33 are disposed in an inflected position, and because of their rigidity are able to support the relative tubular member 21 on the relative cylindrical element 17, and to retain it in a position substantially coaxial to itself during its entire movement.

By virtue of the presence of the sleeves 33, each tubular element 30 behaves as a bi-stable mechanical element arranged to snap into one or other of two stable equilibrium positions, the former corresponding to said retracted rest position and the latter corresponding to said extracted working position.

The progressive expansion of the chambers 43 and 46 causes the movement of each tubular member 21 relative to bead 50, and the consequent outward movement, both in an axial and radial direction, of the relative annular rim 49. The latter become completely wrapped about the lateral and inner surfaces of each bead 50 at the end of the outward movement of each relative tubular member 21, and adheres perfectly to them. This result is also aided by the presence of the rigid portions 48, which compel the relative sleeves 45 to deform outward mainly in a radial direction, to ensure substantially complete outward folding of the relative annular rims 49.

The tubular members 21 are returned to their rest position simply by interrupting the supply of compressed air to the chambers 43 and 46, and connecting these to atmosphere. On lack of pressure, each tubular member 21 is pulled backward by the relative annular element 25 (or manually if the latter should be missing), and also, at least during the final part of its movement, toward its rest position, by the relative tubular element 30 which snaps into its stable retracted rest position.

To conclude this description, it should be noted that the tubular members 21 not only enable the rims 49 to be folded outward without requiring any manual intervention, but also lead to no increase in the overall size of the relative half drums 3 and 4, at least when disposed in their rest position, so enabling all those devices (not shown) which are normally necessary during the manufacture of the carcasses 2 to be installed on the outside of the half drums.

I claim:

1. A tire forming drum of the type comprising two coaxial half drums which are angularly rigid with each other but are mobile axially relative to each other, each said half drum comprising an annular member arranged to support tubular plies of a carcass of a said tire and a respective bead thereof, characterized in that each said half drum further comprises a tubular member which is axially mobile, under the thrust of multiple air chamber means disposed between said annular member and tubular member, between a rest position in an annular seat provided in that end surface of the relative annular member which is opposite the surface of the latter which faces the other said half drum, and an extracted working position in which said air chamber means are arranged to partly wrap around the relative said bead from the inside by way of a relative end of said tubular plies.

2. A drum as claimed in claim 1, characterized in that first resilient means are disposed between said annular member and tubular member to return said tubular member to its said rest position.

3. A drum as claimed in claim 1 or 2, characterized in that second resilient support and guide means are disposed between said annular member and tubular member to support the latter on said annular member and to guide it relative thereto in its movement away from and toward said rest position, while maintaining it substantially coaxial to the relative said seat.

4. A drum as claimed in claim 3, characterized in that said resilient support and guide means comprise an elastically deformable bi-stable element which has two stable equilibrium positions corresponding to said rest and working positions respectively.

5. A drum as claimed in claim 4, characterized in that said elastically deformable element comprises a substantially frusto-conical tubular element, of which one base is fixed to said annular member inside the relative said seat, and the other base is fixed to an inner surface of said tubular member; a central portion of said tubular element being constituted by a tubular sleeve having an axial rigidity which exceeds the rigidity of the remaining parts of said tubular element.

6. A drum as claimed in claim 5, characterized in that said tubular sleeve is constituted by elastomeric material internally reinforced with axially disposed stiffening wires.

7. A drum as claimed in claims 1 or 2 characterized in that said annular member comprises an annular flat plate, from a surface of which there axially extend an outer tubular flange and a cylindrical element which are coaxial to each other and together define said annular seat.

8. A drum as claimed in claims 1 or 2, characterized in that said multiple air chamber means comprise a first, a second and a third annular bead, of which the first two are fixed to said tubular member and the third is fixed to said annular member and has a diameter similar to that of said bead of said carcass, the said first and second bead being disposed at opposite ends of a first elastomeric sleeve, and said second and third bead being disposed at opposite ends of a second elastomer sleeve; the latter having an axial portion which is partly in common with said first sleeve, and is comprised of an elastomeric material which is internally reinforced with axially disposed stiffening wires.

* * * * *